Dec. 31, 1935.  H. LANGE  2,025,874
SLIDING HOOD ON CLOSED VEHICLE
Filed May 23, 1933   2 Sheets-Sheet 1
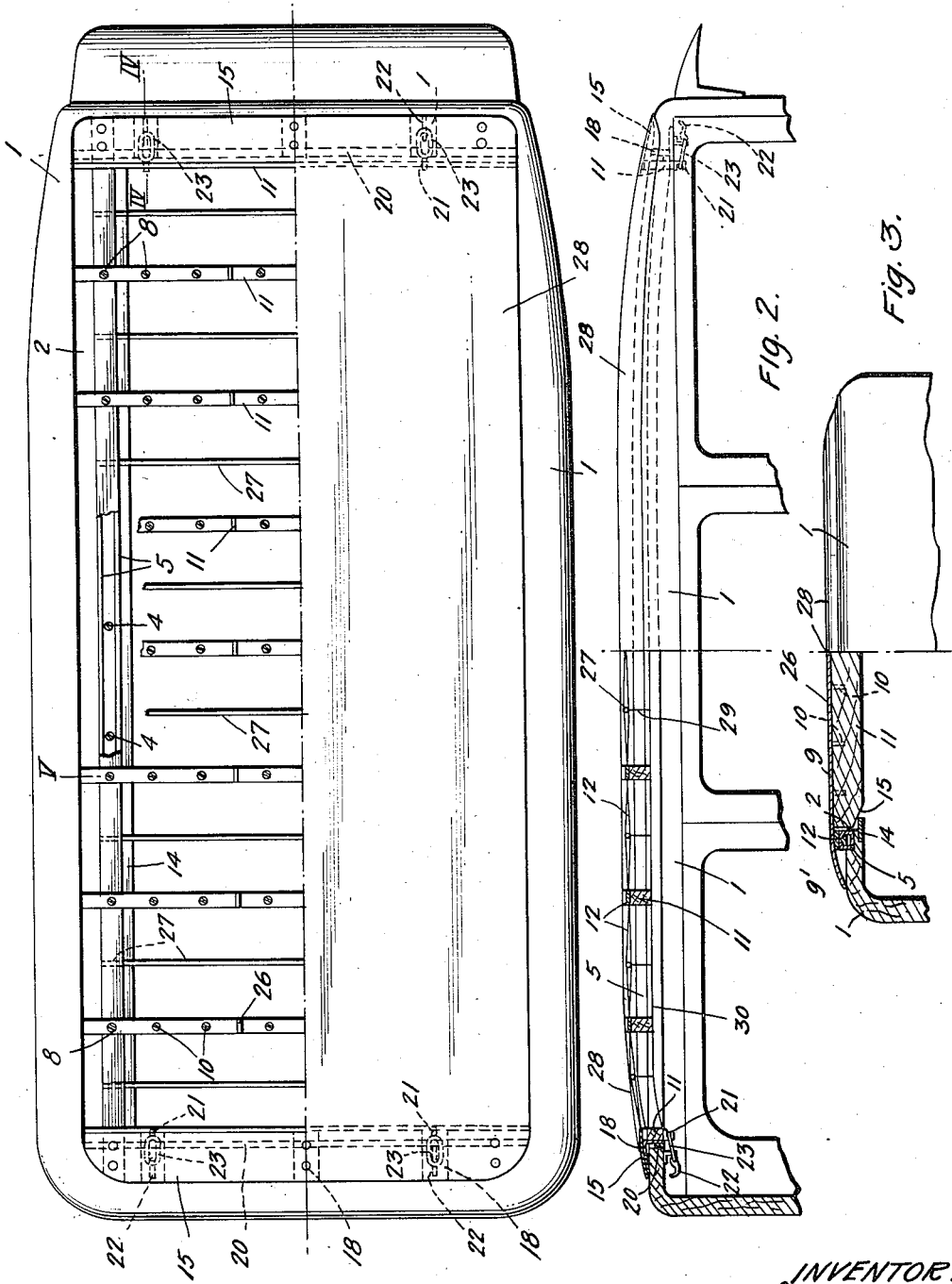
INVENTOR:
H. Lange
By Ferd. Und.
Atty.

Dec. 31, 1935. H. LANGE 2,025,874
SLIDING HOOD ON CLOSED VEHICLE
Filed May 23, 1933 2 Sheets-Sheet 2
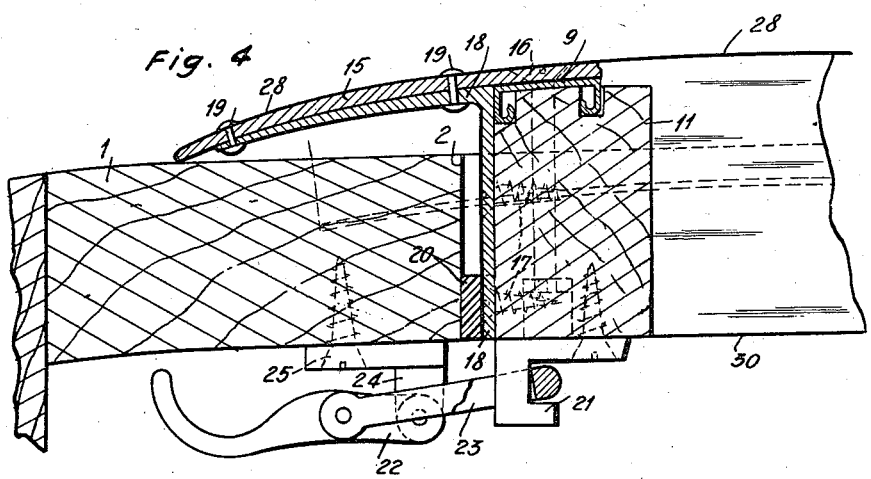
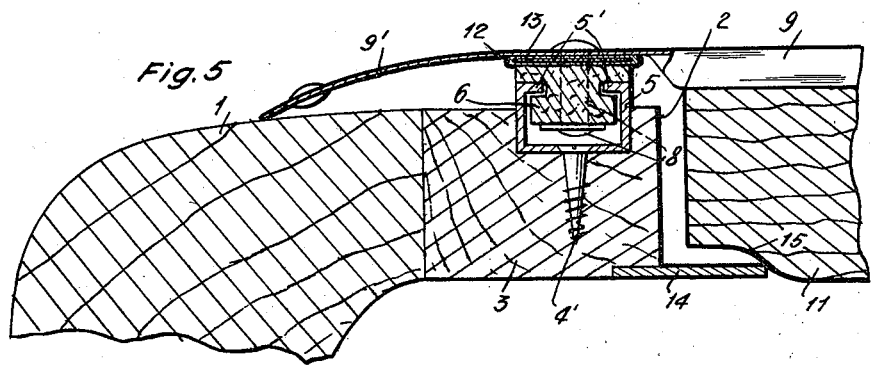
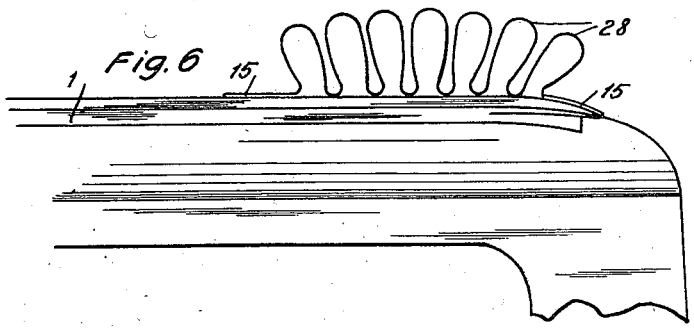
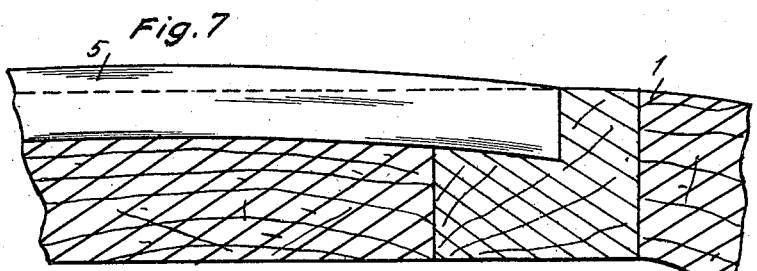
INVENTOR.
Hermann Lange

UNITED STATES PATENT OFFICE 2,025,874

SLIDING HOOD ON CLOSED VEHICLE

Hermann Lange, Erlenbach, Switzerland

Application May 23, 1933, Serial No. 672,447
In Switzerland February 18, 1933

1 Claim. (Cl. 296—137)

In the known sliding hoods for closed vehicles, such as motor cars, which can be opened by pushing together, it has been found, that the hood in the course of time is folded in irregular and too narrow folds, so that the edges of the folds easily become brittle.

It has been proposed to overcome this inconvenience by using leather or steel bands in the hood.

Steel bands possess a specially good bending capability in upward direction but have the inconvenience that, in unsupported arrangement, they break very soon and have no packing effect. In order to obtain good packings on the front and rear ends complicated measures were necessary which nevertheless gave no satisfactory results.

The sliding hood according to the invention is distinguished in that during the sliding of the hood into the front or rear extreme position the cover plate of the corresponding tilt hoop is pressed on to the roof with gradually increasing force. As soon as the hoops are out of the extreme positions the cover plates stand off the roof so that they do not slip on the same. The intensive pressure of the cover plates on to the roof ensures an absolutely secure protection against weather and dust. No damaging is possible as the cover plates, besides in the extreme positions, are always spaced from the roof.

This advantage is obtained according to the invention by the downwardly curved end portions of the guide bars which more strongly pull down the extreme hoops and thus press strongly against the roof the yieldable cover plates fixed on the extreme hoops and overlapping the roof.

An embodiment of the invention is illustrated by way of example in the accompanying drawings in which:—

Fig. 1 is a top plan view of the hood roof, the covering material being partly removed.

Fig. 2 shows the hood partly in side elevation and partly in longitudinal section.

Fig. 3 shows the hood partly in rear elevation and partly in cross section.

Fig. 4 is a section on line IV—IV of Fig. 1 on a larger scale.

Fig. 5 is a section on line V—V of Fig. 1.

Fig. 6 is a side elevation showing the sliding hood in open position, that is pushed towards the rear portion of the vehicle.

Fig. 7 shows on an enlarged scale an end portion of a guide bar.

In the drawings 1 designates the roof of a closed motor car having a rectangular aperture 2 extending over almost the entire area. Guide bars 5 are fixed by means of screws 4 along the longitudinal side bars 3 of the aperture and project about half their height therefrom. The guide bars are channel-shaped and have inwardly bent longitudinal edges 5'. Guide elements 6 made of bend-leather have incisions 7 in which the edges 5 engage. The guide elements 6 are secured by means of bolts 8 to bars 9 of U-shaped cross-section rigidly mounted on the hoops or transverse bars 11 by means of screws. The hoop bars 9 have lateral extensions $9^1$ which project beyond the guide bars, are bent and resiliently supported so that their ends bear against the upper side of the roof 1. The hoop bars 9 are interconnected by bands 12 and carry thin steel spring inserts 13 resiliently reinforcing the bands 12. The bands 12 are mounted between the guide elements 6 and the extensions 9' and held by the bolts 8. Inwardly projecting holding strips 14 are mounted on the under sides of the side bars 3 and project into recesses 15 in the ends of the hoops or engage under the hoops. On the front and rear hoop bars 9 cover plates, projecting towards the front and rear respectively, are fixed by means of bolts 16 and project a considerable distance beyond the ends of the aperture 2. On the front and rear sides of the front and rear hoops angle pieces 18 are fixed by screws 17, the horizontal arms of these angle pieces being rigidly connected to the cover plates by means of rivets 19 and serve as supports. Rubber strips 20 are mounted on the ends of the aperture to form a tight closure, and into these rubber strips the angle piece 18 are pressed when the adjacent bar bears tightly against the strips. On the under side of the front or rear hoop catches 21 are arranged in which catches bows 23 rotatable on stretching levers 33 are suspended. The stretching levers 22 are pivotally mounted in the supports 24 which are fixed by means of screws 23 in the roof near the sides of the aperture 2.

The ends of the guide bars, which project about half their height from the roof or the longitudinal bars, are curved, inclined and gradually sunk therein, as shown in Fig. 7.

The hoop bars 9 are each made in several parts, preferably three, the two extreme parts having each an extension $9^1$. This arrangement of the hoop bars 9 prevents of employing standardized parts for hoops of different lengths, which always vary according to the width of the aperture 2 in the roof 1. Consequently, gaps 20 are produced between the adjacent ends of the hoop bar parts 9, larger or smaller according to the length of the hoops. Between the hoops transverse wire rods 27 are arranged, the ends of which are fixed in the bands 12. A waterproof sliding hood covering 28, preferably made of rubber material, extends over the hoops, extensions and cover plates. Bands 29 hang from the wire rods 27, and lining material 30 stretched over the hoop is sewn to these bands.

For the purpose of opening the sliding hood the bows 20 on the front or rear hoops must be disengaged and this hoop is then pushed towards the front or rear end of the aperture. The sliding hood can also be folded together towards the middle of the aperture 2. If the front or rear hoop is pushed towards the rear or front end of the aperture respectively, this hoop is lifted slightly together with the coordinate cover plate 15 owing to the peculiar structure of the ends of the guide bars 5, so that this plate does not scrape along the roof and damage the roof and the hood materials 28 and 30. The curved, gradually sinking ends of the guide bars 5 press the cover plates 18 against the roof 1 when the front and rear hoops are being slid into their extreme position, and thus ensure a reliable closure, so that draught, dust and rain are excluded. The resilient projections $9^1$ of the hoop bars 9, which likewise bear on the roof, effect a good closure of the longitudinal sides of the aperture. The penetration of foreign substances is prevented owing to the holding of the guide bars 5 projecting above the roof and to the bands 12 provided with the inserts 13. The holding strips 14 also hold the hoops 11 in the proper position so that they cannot be pressed downwards and thus prevent the extensions $9^1$ from bending.

During the pushing together of the hoops 11 the bands 12, owing to the steel spring inserts 13, and consequently the hood materials 28 and 30 are folded in regular folds curved in upward direction. Consequently the hood material cannot be irregularly folded, clamped or pressed between the hoops.

I claim:—

A sliding hood for vehicles with open roof, comprising in combination with the tilt hoops, guide bars on the longitudinal sides of the aperture of the roof having downwardly curved end portions, and yieldable cover plates projecting forwardly and rearwardly from the front and rear tilt hoops respectively adapted to be strongly pressed against the roof by said downwardly curved end portions of said guide bars.

HERMANN LANGE.